No. 608,994. Patented Aug. 9, 1898.
T. J. RYLAND.
DOVETAILING MACHINE.
(Application filed July 22, 1897.)
(No Model.) 9 Sheets—Sheet 1.

Fig. 1.

Witnesses
Inventor
Thomas James Ryland

No. 608,994. Patented Aug. 9, 1898.
T. J. RYLAND.
DOVETAILING MACHINE.
(Application filed July 22, 1897.)

(No Model.) 9 Sheets—Sheet 3.

No. 608,994. Patented Aug. 9, 1898.
T. J. RYLAND.
DOVETAILING MACHINE.
(Application filed July 22, 1897.)

(No Model.) 9 Sheets—Sheet 4.

No. 608,994. Patented Aug. 9, 1898.
T. J. RYLAND.
DOVETAILING MACHINE.
(Application filed July 22, 1897.)
(No Model.) 9 Sheets—Sheet 5.

No. 608,994. Patented Aug. 9, 1898.
T. J. RYLAND.
DOVETAILING MACHINE.
(Application filed July 22, 1897.)
(No Model.) 9 Sheets—Sheet 7.

Witnesses
M. V. Bidgood
Q. P. Hammond.

Inventor
Thomas James
Ryland

UNITED STATES PATENT OFFICE.

THOMAS J. RYLAND, OF LONDON, ENGLAND, ASSIGNOR OF ONE-HALF TO EARLE BIRD, OF ROBERTSBRIDGE, ENGLAND.

DOVETAILING-MACHINE.

SPECIFICATION forming part of Letters Patent No. 608,994, dated August 9, 1898.

Application filed July 22, 1897. Serial No. 645,585. (No model.)

*To all whom it may concern:*

Be it known that I, THOMAS JAMES RYLAND, a subject of the Queen of Great Britain, residing at Brixton, London, in the county of Surrey, England, have invented certain new and useful Improvements in Dovetailing-Machines, of which the following is a full, clear, and exact description.

The invention has for its object improvements in dovetailing machinery, with a view to the production of a cheap, convenient, and efficient machine of the miter-dovetailing type. Such machines are adapted to clamp the boards in either or both of two different directions at right angles to one another and to cut the dovetails in both of said boards simultaneously.

One object of my invention is to render the flaring tool that cuts the notches so adjustable at an angle that its advancing edge will cut the bottom of the notches at right angles to the board, so as to cause the dovetailed edges to fit more squarely together.

My invention further relates to a special form of power-transmitting mechanism for maintaining rotation of the cutter as it is shifted.

My invention is illustrated in the accompanying drawings, in which—

In all the figures like parts are indicated by similar letters of reference.

I will first describe the machine shown at Figs. 1 to 5. According to my invention I employ a rotating spindle $a'$, slightly inclined from the vertical, to carry the dovetailing-tool $a$, and I mount this spindle $a'$ in bearings $b$, carried by the front rail $b'$ of a movable frame $b'$ $b^2$ $b^2$ $b^3$, capable of movement in any direction in a horizontal plane in the following manner: This frame has fitted thereto grooved rollers $b^4$, supported on a bar $c$, with capability of moving to and fro thereon in a line parallel with the front of the machine, and this bar $c$ is fitted with grooved rollers $c'$, supported on bars $d$, with capability of moving to and fro thereon in a line at right angles with the bar $c$. I connect the front rail $b'$ of this movable frame by a bracket $b^*$ to a pin $e'$, fixed to and standing up from a slide $e$, carried by and capable of movement in a direction from front to back of the machine on another slide $f$ at right angles thereto, which latter slide is capable of movement in a direction parallel with the front of the machine on a bed $g$, fixed to the top or table $h'$ of the machine-frame $h$. $f$ is an adjustable stop to limit the backward motion of the slide $e$, and consequently of the cutter-frame. By this means the front $b'$ of the movable frame $b'$ $b^2$ $b^2$ $b^3$ is capable of regulation in height on the pin $e'$ to regulate the depth to which the dovetailing-tool $a$ shall cut. The front rail $b'$ of this movable frame is capable of a swiveling motion on the screws $b^5$ to enable it to retain its required position, notwithstanding that the other parts of the frame may at times be somewhat inclined. This said bar $b'$ is when adjusted fixed rigidly to the other parts of the movable frame by locking-bolts $b^6$. The cutter-spindle $a'$ has fixed thereon a pulley $a^2$, around which a band or cord $i$ is passed, and when the machine is dovetailing short lengths of material such band or cord $i$ passes directly backward and over guide-pulleys $b^7$, mounted on the bar $b^3$ of the movable frame, thence over guide-pulleys $j'$, carried by a shaft $j$, mounted in guides $j^2$, and pulled downward by springs $j^3$ to keep a constant tension on the band or cord $i$, and from such guide-pulleys $j'$ the band or cord $i$ is passed around the drum $k$ or around a traveling wheel, to which rotary motion is given by a strap passing around a pulley $k'$ on the axis thereof.

Figure 5:
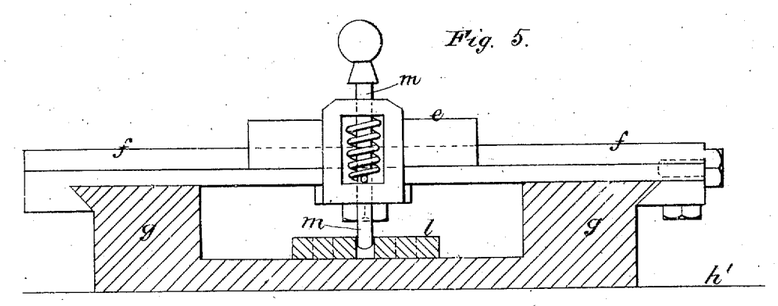
Figure 5A:
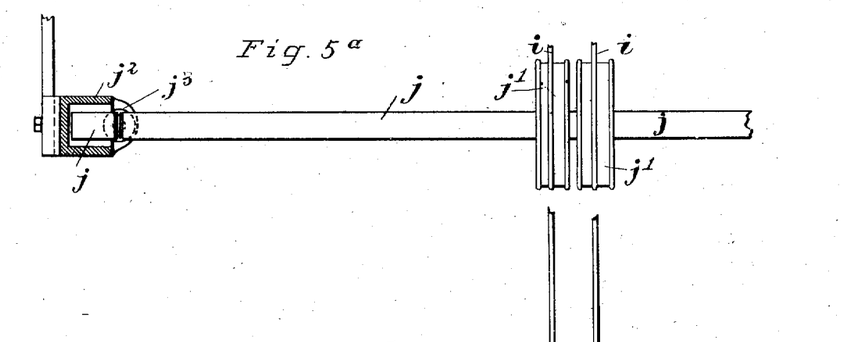
Figure 5B:
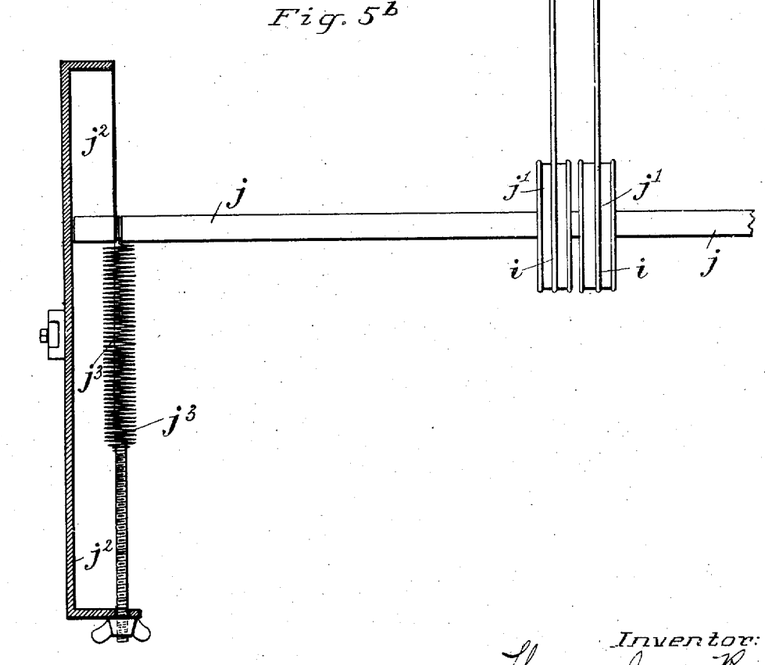
Figure 6:
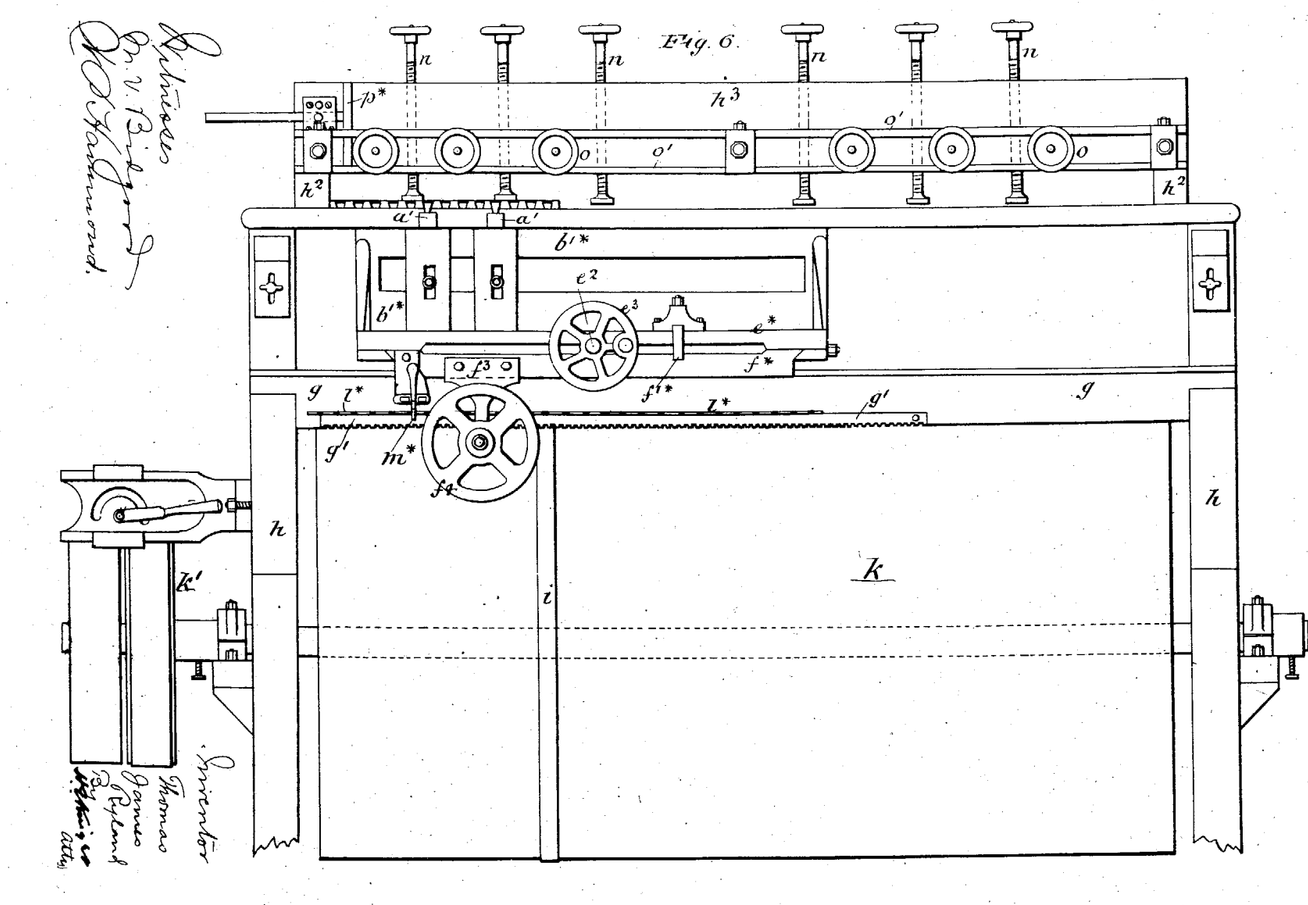
Fig. 6 is a front view, Fig. 7 a plan, and Fig. 8 a cross-section of a modified form of dovetailing-machine.
Figure 7:
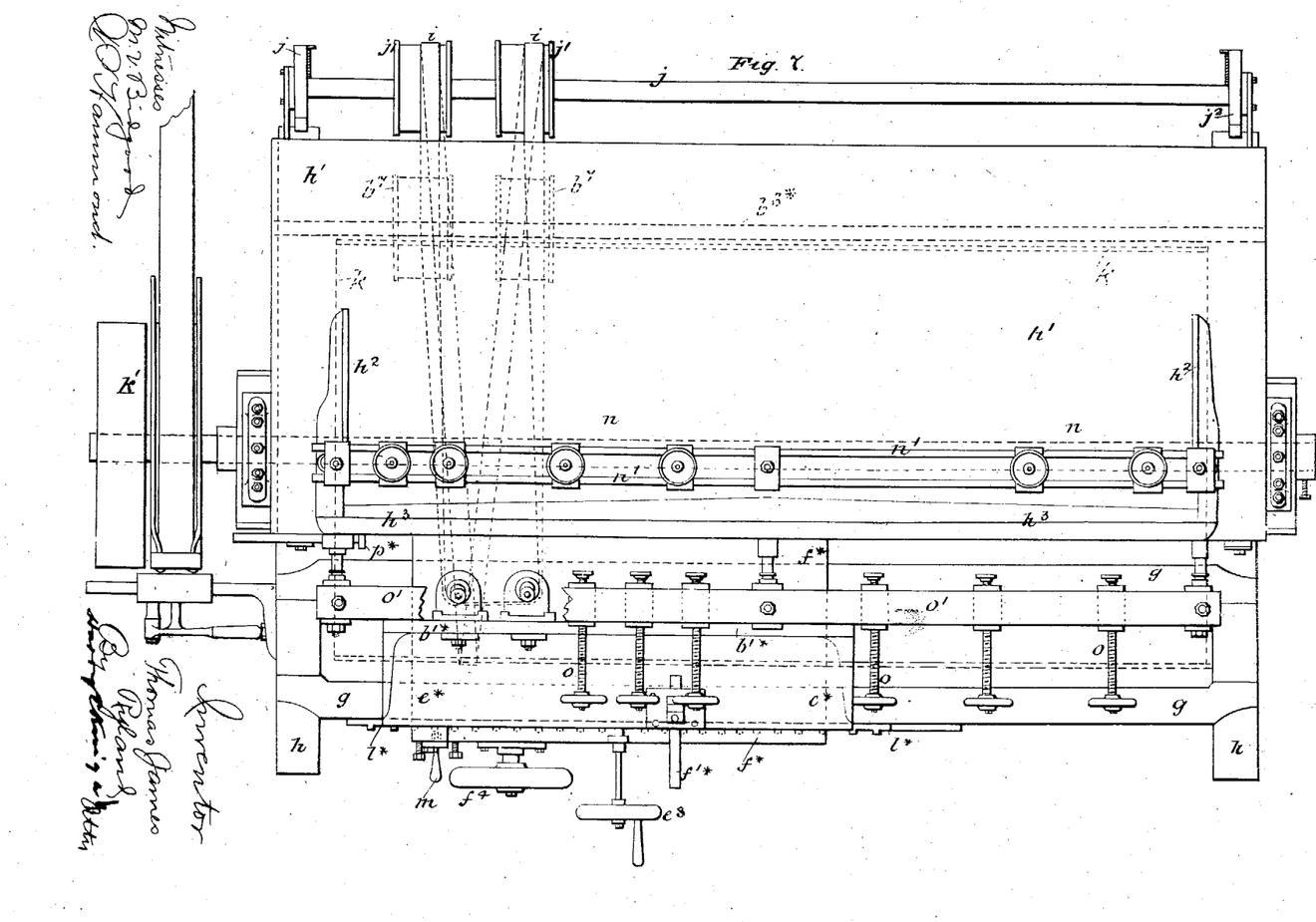
Figure 8:
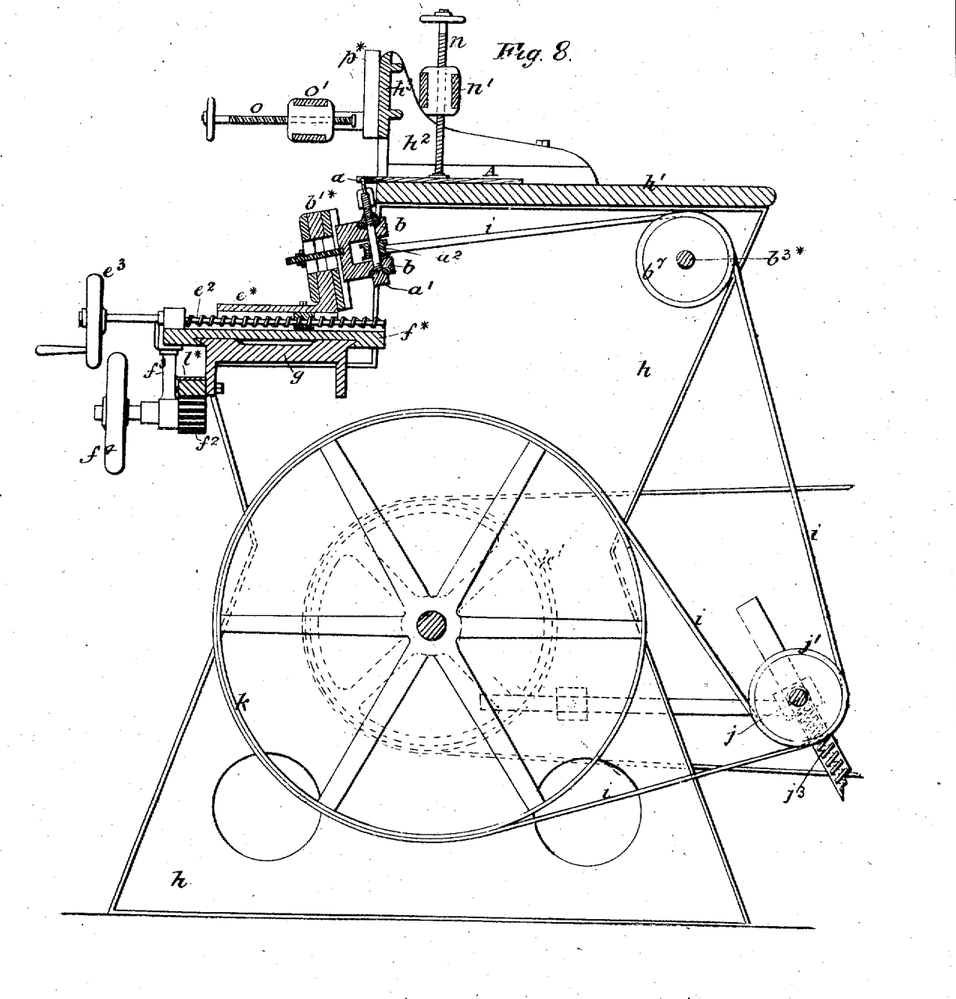
Figures 9, 10, 11, 12:
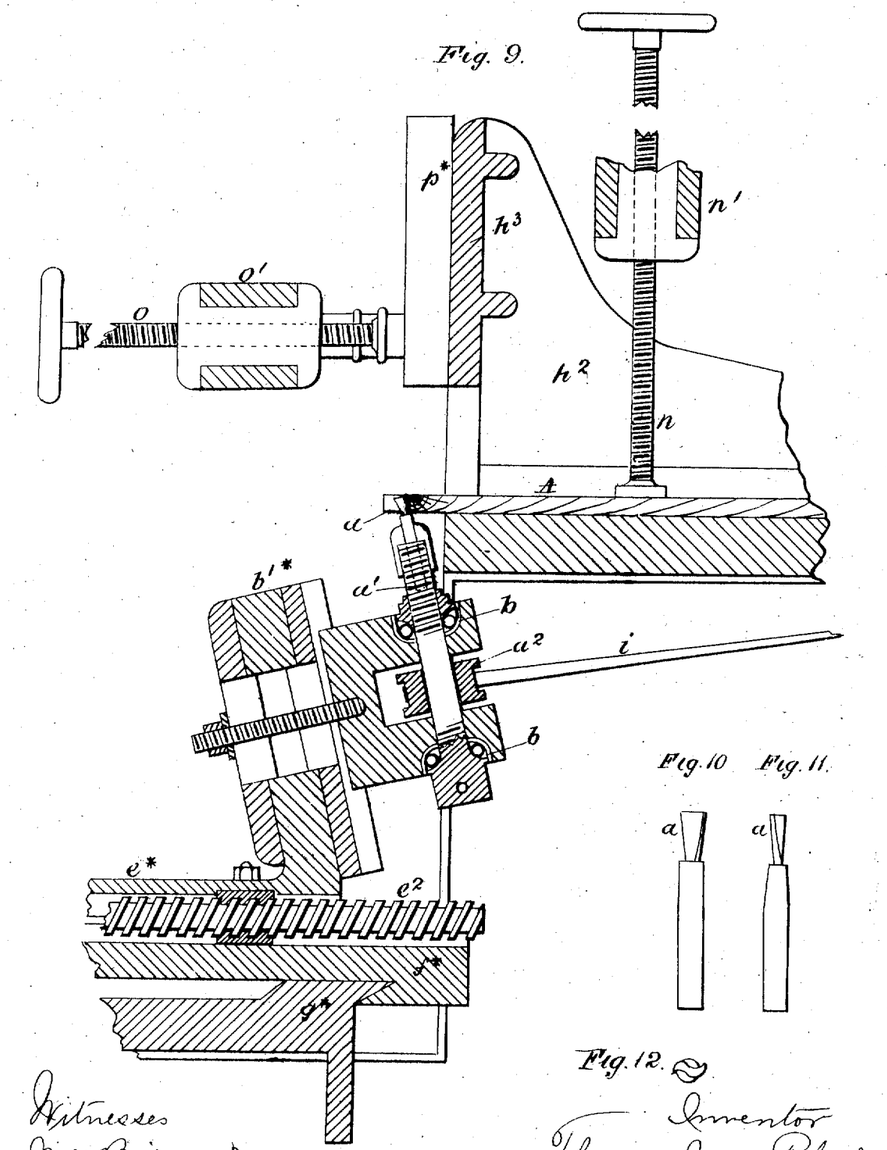
Fig. 9 is a cross-section of parts drawn to a larger scale than Figs. 6, 7, and 8.
Figs. 10, 11, and 12 are respectively two elevations drawn at right angles to each other and an end view of the rotary dovetailing-tool.

From Fig. $5^a$ it will be seen that the shaft $j$ is supported by the bands $i$, passing around the pulleys $j'$, and that the springs $j^3$, which at their upper ends embrace these shafts, are attached at their other ends to the guides $j^2$, so as to tend to pull down the shaft $j$, the latter sliding in said guides $j^2$. By this means the bands $i$ are kept in tension. When, however, long lengths of material are being dovetailed, I pass the band or cord $i$ sidewise from the pulley $a^2$ on the spindle of the rotating cutter $a$ and thence over guide-pulleys $b^8$, whence it passes over guide-pulleys $b^7 j'$ to and around the drum $k$. This latter arrangement of the driving band or cord leaves the machine-bed free behind the cutter to accommodate any length of material required to be dovetailed.

Figure 1:
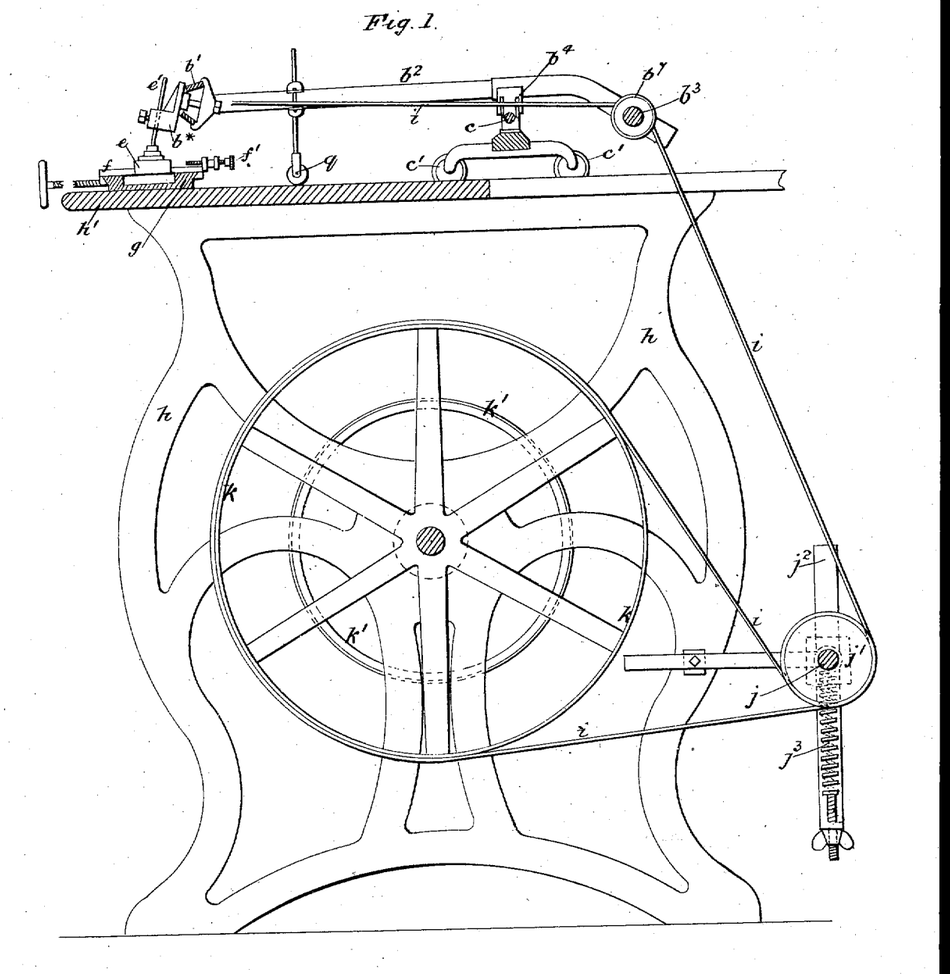
Figure 1 is a vertical section, Fig. 2 a plan, Fig. 3 a vertical section of parts drawn to a larger scale than Figs. 1 and 2, and Figs. 4, 5, $5^a$, and $5^b$ details drawn to a still larger scale, of a dovetailing-machine constructed according to my invention.
Figure 2:
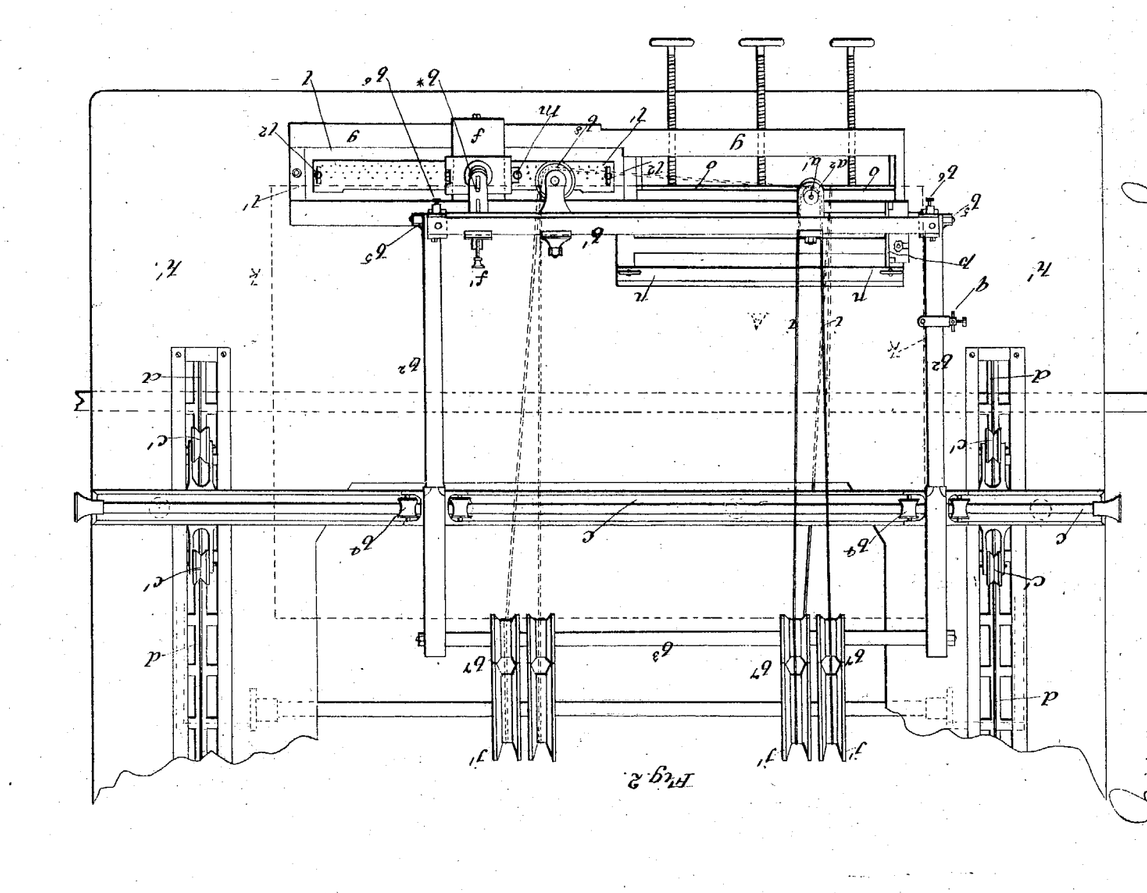
Figure 3:
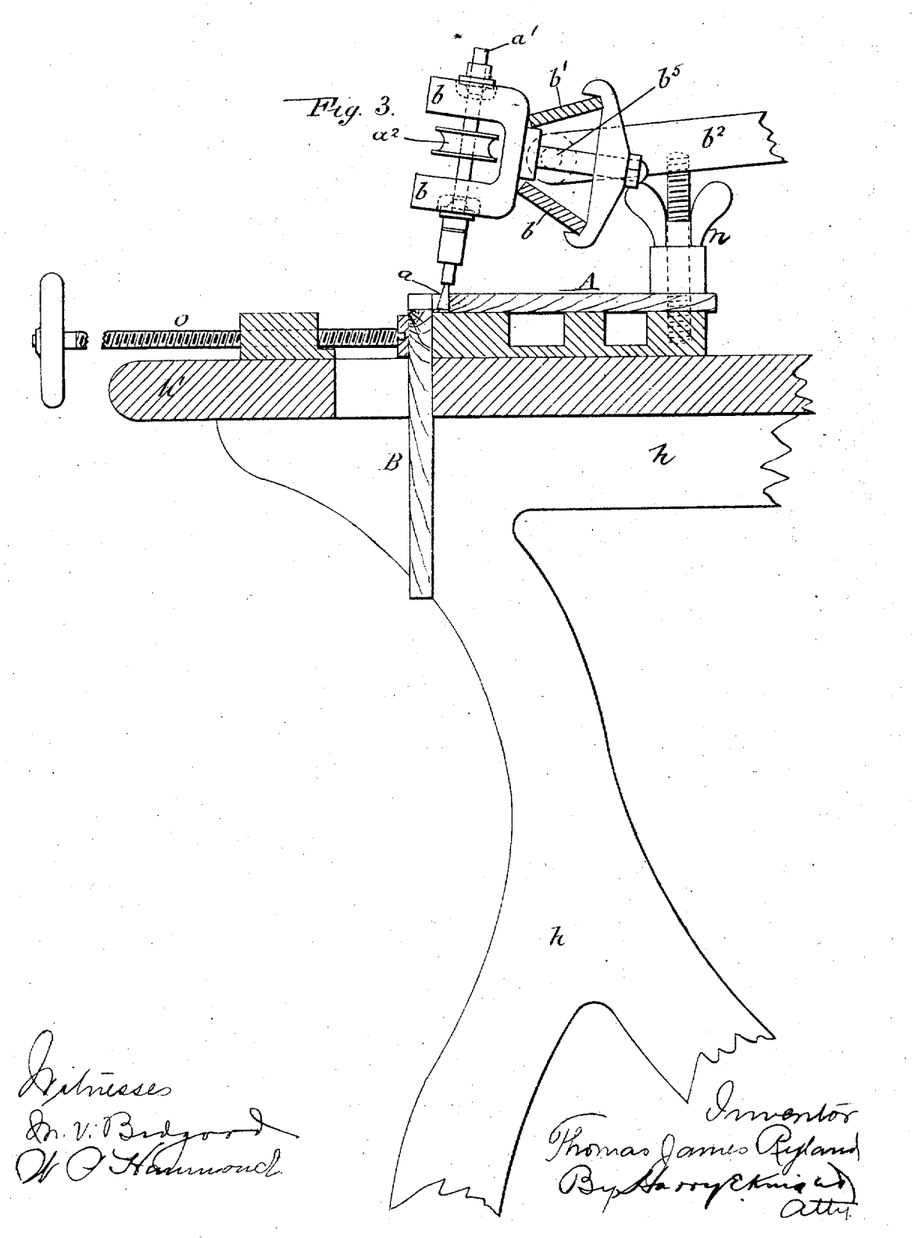
Figure 4:
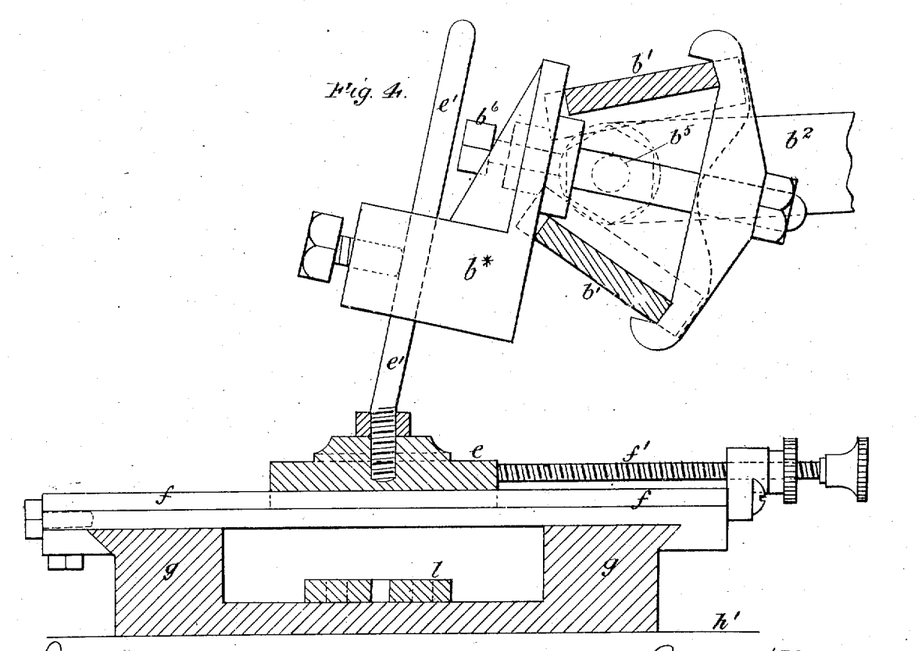

The top or table $h'$ has fixed thereto a dividing-plate $l$, with rows of holes formed therein in directions lengthwise thereof, and a spring-finger $m$, carried by the slide $f$, is capable of being placed in succession or in other desired order in said holes of either row to shift the cutter $a$ to the positions required for the dovetails, to facilitate which the dividing-plate $l$ is capable of adjustment by means of the slots $l'$ and binding-screws $l^2$ to bring either row of holes into line with the spring-finger $m$. The top or table of the machine is also provided with horizontal clamping mechanism $n$ and vertical clamping mechanism $o$, so that when required a piece of material A, lying flat on the machine-bed, may be clamped to another piece B, placed in a vertical position, to enable the dovetails in both pieces to be simultaneously cut, as represented at Fig. 3, while the said clamping arrangements may, if required, be separately used. $p$ is an adjustable fence against which the material is placed. $q$ is a roller to support the movable frame $b' b^2 b^2 b^3$ on one side to prevent twisting thereof in use. Thus when material is clamped in position and the dovetail-cutter set in motion the frame $b' b^2 b^2 b^3$ is pushed back until the slide $e$ comes against the stop $f'$, which will limit the distance to which the cutter will act on the material. The cutter-frame is then pulled forward, the spring-finger $m$ lifted out of the hole in the dividing-plate $l$, the slide $e$ and cutter-frame are moved sidewise to the next hole in the dividing-plate $l$, and the spring-finger $m$ dropped therein, when the cutter-frame is again pushed backward and a fresh notch cut in the material, and so on.

In Fig. 3 the cutter is represented as cutting a "lap" dovetail.

The object of adjusting the tool to the inclined position, as hereinbefore explained, is to enable the advancing edge of the tool to cut the bottom of the slots in boards—for example, the board A in Fig. 3—at right angles to the face of the board, and thus facilitate accurate fitting together of the boards and improving the appearance of the work.

I will now describe the machine represented at Figs. 6 to 9. The cutter $a$ (shown at Figs. 10, 11, and 12) is precisely similar to that used in the machine shown at Figs. 1 to 5; but in the modification shown at Figs. 6 to 9 the said cutter is reversed in position and two are shown in use, both being driven by the same band $i$. The bar $b'^*$, carrying the cutters, is a fixture on the slide $e^*$, and the latter is moved backward and forward by a hand-wheel $e^3$ and screw $e^2$, instead of being merely pushed. The slide $f^*$ is moved along the bed $g$ by means of a pinion $f^2$ on an axis carried by a bracket $f^3$, fixed to the slide $f^*$. Such pinion gears with a rack $g'$, fixed to the bed $g$, and is rotated by hand-wheel $f^4$. The clamping mechanisms $n$ and $o$ are carried, respectively, by bars $n' o'$, attached to brackets $h^2$, fixed to the machine-frame. The stop $f'^*$ is carried by the slide $e^*$ and acts against the front of the slide $f^*$. The dividing-plate $l^*$ has notches formed on its front edge and is fixed to the bed $g$. A hinged finger $m^*$, mounted in a bracket attached to the slide $f^*$, acts in connection with such dividing-plate to determine the distance of travel of the cutters $a$. An adjustable fence $p^*$ is fixed to the front bar $h^3$. To vary the distance of travel of the dovetailing-cutters, I employ dividing-plates $l^*$, differently divided, and substitute one for the other, as may be required. If a long notch is required between the dovetailing-pins, the spaces in the dividing-plate are elongated to correspond.

The action of the two machines is identical, and the material to be dovetailed is held in like manner, with the exception that the piece of vertical material extends above the table $h'$ and the cutters are reversed in position in the latter modification. The cutters of both machines are mounted and rotated alike, and they are carried in both cases by a bar which is capable of being moved by means of cross-slides in directions from front to back and sidewise of the machine.

It will be evident that more than two cutters may be employed and that more than a single piece of material may be worked at the same time in this latter machine.

Having fully described my invention, what I desire to claim and secure by Letters Patent is—

1. In a miter-dovetailing machine, the combination with means for clamping boards in two directions at right angles to one another, of an outwardly-flaring cutting-tool, means for supporting said tool and moving it longitudinally of the work comprising adjusting devices whereby the tool may be angularly adjusted to bring one of its edges in parallelism with the edge of one of the boards, and means for rotating the cutting-tool, substantially as and for the purpose set forth.

2. In a dovetailing-machine, the combination of a rotary cutter of shape to form a dovetail notch, a spindle for said cutter, a movable bar on which said spindle is mounted at an angle to the work, a pulley on the cutter-spindle, a band passing round such pulley, guide-pulleys and tension-pulleys over which such band passes, a drum for driving such band, cross-slides carrying the cutter-carrying bar, a dividing-plate and a finger acting therewith to regulate the distance of travel sidewise of the cutter, and a stop to limit the inward travel of the cutter, substantially as herein set forth.

In testimony whereof I affix my signature in presence of two witnesses.

T. J. RYLAND.

Witnesses:
 B. J. B. MILLS,
 CLAUDE K. MILLS.